Mar. 13, 1923.　　　　　C. F. MOCK ET AL　　　　　1,448,562
DIRIGIBLE HEADLIGHT ATTACHMENT FOR AUTOMOBILES
Filed Mar. 15, 1921

Inventor
C. F. Mock
W. F. Goodman,
By
Geo. F. Kimmel, Attorney

Patented Mar. 13, 1923.

1,448,562

UNITED STATES PATENT OFFICE.

CHARLES F. MOCK AND WILLIAM F. GOODMAN, OF TOLEDO, OREGON.

DIRIGIBLE HEADLIGHT ATTACHMENT FOR AUTOMOBILES.

Application filed March 15, 1921. Serial No. 452,627.

*To all whom it may concern:*

Be it known that we, CHARLES F. MOCK and WILLIAM F. GOODMAN, citizens of the United States, residing at Toledo, in the county of Lincoln and State of Oregon, have invented certain new and useful Improvements in Dirigible Headlight Attachments for Automobiles, of which the following is a specification.

This invention relates to dirigible automobile head-lights.

The object of the invention is to provide a simple and efficient mechanism for so mounting the head-lights and connecting them with the steering wheels of the automobile so that the lamps will correspondingly turn with said wheels to cause the rays of the light to be directed ahead of the car in the direction the car is about to travel.

Another object is to so construct such mechanism that it may be applied to an automobile already in use without making any change therein except to add to the car fender braces a couple of bearings, which receive and support the lamp carrying rods or stems.

Another object is to provide such a device capable of adjustment for taking up wear or for adjusting it to cars of slightly different construction.

With these and other objects in view, the invention consists in certain novel features of construction as hereinafter shown and described and then specifically pointed out in the claims.

Figure 1:
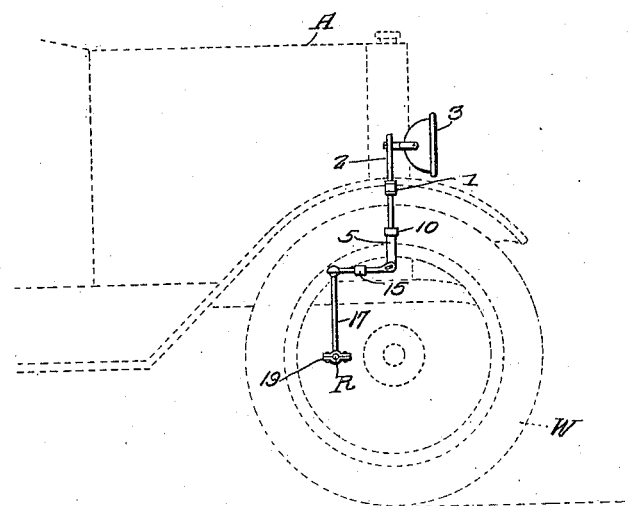
Figure 1 represents a side elevation of the device constituting this invention shown applied, the automobile being illustrated in dotted lines and the front portion thereof only shown.

In the embodiment illustrated, a motor vehicle of the Ford type is shown in dotted lines, indicated by the reference character A, and which is equipped with the usual front steering wheels W mounted on stub axles in the ordinary way and said axles connected with the rearwardly extending steering arms. Pivoted to the arms SA is the connecting rod R on which the mechanism constituting this invention is designed to be clamped.

The car is equipped at each side, preferably on the fender brace with a bearing 1 to receive and rotatably support an upright lamp rod or stem 2, which supports at its upper end a lamp 3 of any desired or suitable construction.

It is of course understood that two of these lamps are employed, as is shown clearly in Fig. 2, but the mechanisms supporting and mounting them being exactly the same, one only will be described in detail.

Figure 3:
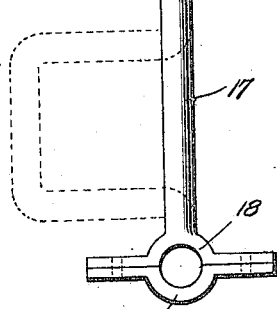
Fig. 3 is an enlarged detail side elevation of the mechanism constituting this invention with the parts broken out and in section.
Figure 4:
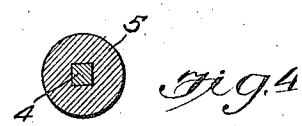
Fig. 4 is a detail transverse section taken on the line 4—4 of Fig. 3.

The lamp post or stem 2 has its lower end reduced, as shown at 4 and said reduced end is made angular in cross section and adapted to fit snugly in a correspondingly shaped bore 6 formed in the upper end of an upright post or rod 5. The bore 6 in the upright 5 merges at its upper end into an enlarged chamber 7 in which is mounted a spring 8 coiled around said reduced post portion 4 and abutting at one end against the lower wall of the chamber 7 and at its upper end against the shoulder 9 formed at the junction of said reduced portion 4 with the body of the post 2, as shown clearly in Fig. 3. A removable collar 10 is encircled around the lower end of the post 2 and has threaded engagement with the upper end of the standard 5.

Hingedly connected with the lower end of the standard 5 is a laterally extending rod 11 having a head 12 for connection with said standard, said head being longitudinally slotted, as shown at 13 to receive the connecting pintle 14 which unites the two members. This rod 11 is threaded at its free end and is connected by a sleeve 15, with a cooperating rod 16, which has a ball and socket connection at its other end with an upstanding rod 17, the lower end of which carries a clamp member 18 adapted to partially encircle the connecting rod R and to be held engaged therewith by a co-operating clamp member 19. The ball and socket joint 20 which connects the members 16 and 17 permits a vertical movement of the member 16 relatively to the member 17, the latter being rigidly clamped to the rod R. The slotted connection between the upright or standard 5 and the rod 11 also provides for a slight vertical movement, while the coiled spring 7 operates as a shock absorber or cushion and at the same time permits a slight vertical movement of the lamp post 2 in its socket.

Figure 2:
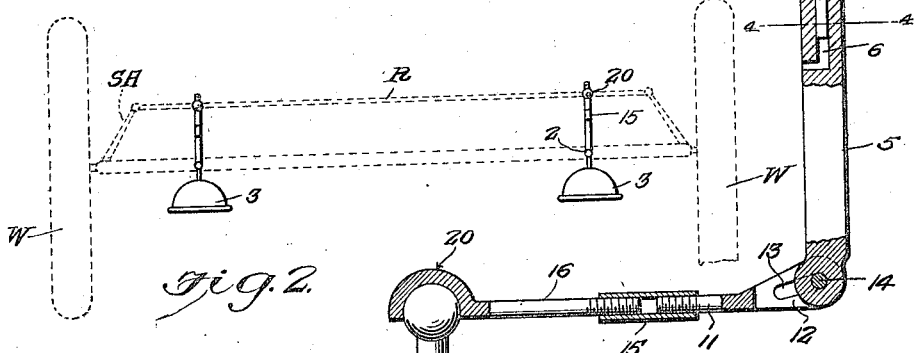
Fig. 2 is a top plan view.

In the use of this invention, one of these lamp supporting mechanisms is attached to each end of a connecting rod R, as shown in Fig. 2, the lower upright 17 being rigidly clamped to said rod, while the upper lamp post carrying standard 5 is hingedly connected with the laterally extending sectional arm formed of the two members 11 and 16 connected by the sleeve or turn-buckle like structure with the lamp post 2 rotatably mounted in the bearing 1 on the car. The sleeve 15 which connects the two rods 11 and 16 provides for the adjustment of these rods toward or away from each other to adapt the device to cars of different sizes or slightly different construction. These mechanisms being mounted on a connecting rod in the manner above described, it will be obvious that the turning of the steering wheels W will operate through said rod R to turn the lamps in the direction in which the vehicle is being steered so that they will direct their rays in front of the vehicle in the direction of its line of travel.

The preferred embodiment of the invention is disclosed in the drawings and set forth in the specification, but it will be understood that any modifications within the scope of the claimed invention may be made in the construction without departing from the principle of the invention or sacrificing any of its advantages.

We claim:

1. A dirigible head-light attachment for automobiles comprising an upright standard having a clamp at its lower end for rigid connection with the steering rod of an automobile, an arm extending laterally from its upper end and having a ball and socket connection therewith, an upright rod carried by the other end of said arm and hingedly connected therewith, said rod having a socket in its upper end enlarged at its outer portion, the lower portion of said socket being angular in cross section, a lamp post having a reduced extension mounted in said socket and of a cross sectional contour conforming to the contour of the socket, means for securing said post in said socket and a coiled spring on said post mounted in the enlarged portion of the socket.

2. A dirigible head-light attachment for automobiles comprising an upright standard having a clamp at its lower end for rigid connection with the steering rod of an automobile, an arm extending laterally from its upper end and having a ball and socket connection therewith, an upright rod carried by the other end of said arm and hingedly connected therewith, said rod having a socket in its upper end enlarged at its outer portion, the lower portion of said socket being angular in cross section, a lamp post having a reduced extension mounted in said socket and of a cross sectional contour conforming to the contour of the socket, means for securing said post in said socket and a coiled spring on said post mounted in the enlarged portion of the socket, and a bearing adapted to encircle said lamp post and to be connected with a stationary part of the car.

In testimony whereof, we affix our signatures hereto.

CHARLES F. MOCK.
WILLIAM F. GOODMAN.